United States Patent [19]

Worcester

[11] 3,715,671

[45] Feb. 6, 1973

[54] MULTIPLE SPREADBAND TUNING IN A VARACTOR TUNED RADIO RECEIVER

[75] Inventor: Joseph A. Worcester, Frankfort, N.Y.

[73] Assignee: General Electric Company, Syracuse, N.Y.

[22] Filed: Dec. 29, 1970

[21] Appl. No.: 102,331

[52] U.S. Cl. ..............325/468, 325/422, 325/DIG. 1, 334/11, 334/15

[51] Int. Cl. ..............................................H04b 1/16

[58] Field of Search ......334/11, 14, 15, 16; 325/335, 325/373, 418, 420, 422, 468, 469, 470, DIG. 1

[56] References Cited

UNITED STATES PATENTS 3,110,004 11/1963 Pope .....................................334/15

3,204,207 8/1965 Denker.................................334/15

FOREIGN PATENTS OR APPLICATIONS 1,198,425 8/1965 Germany...............................334/15

*Primary Examiner*—Robert L. Griffin

*Assistant Examiner*—Joseph A. Orsino, Jr.

*Attorney*—Marvin A. Goldenberg, W. J. Shanley, Jr., Frank L. Neuhauser, Oscar B. Waddell and Joseph B. Forman

[57] ABSTRACT

In a radio receiver including varactors for tuning the receiver, a circuit is provided for regulating the range of voltage impressed upon the varactors, to tune the receiver to any selected one of a plurality of spreadbands. This circuit includes first, second, and third variable resistances. A first contact means simultaneously adjusts the resistance of the first and second variable resistances to vary the ratio therebetween for impressing a given range of voltage across the varactors to tune to a selected spreadband. A second contact means adjusts the third variable resistance means to impress a particular voltage, within the given range of voltage, upon the varactors to tune the receiver to a particular frequency within the selected spreadband.

4 Claims, 1 Drawing Figure

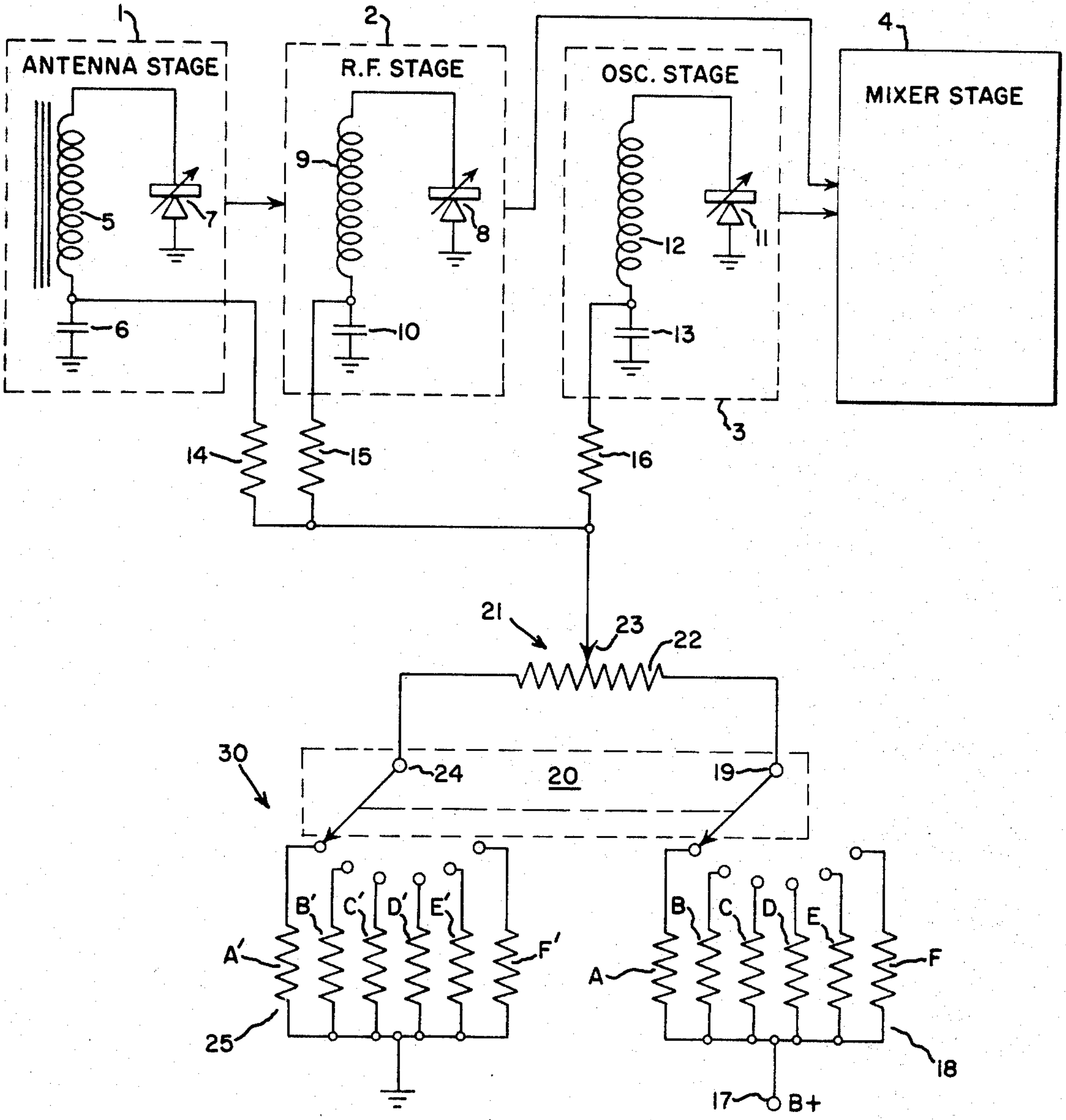
INVENTOR:
JOSEPH A. WORCESTER,
BY [signature]
HIS ATTORNEY.

MULTIPLE SPREADBAND TUNING IN A VARACTOR TUNED RADIO RECEIVER

BACKGROUND OF THE INVENTION

The present invention relates to radio receiving apparatus, and more particularly, to circuitry for tuning a selected one of a plurality of spreadbands within the radio receiver. In prior art receivers, and particularly in short wave receivers, requiring a plurality of spreadbands, the arrangements for switching from one spreadband to the other have tended to complicate the chassis construction and to mitigate against high volume production. It has been customary to employ high frequency switching to shift from one spreadband to the other, where the switching components are connected directly to the high frequency circuitry. As a result, it has been necessary to space the switch wafers adequately and to shield the switch wafers from each other. This has significantly increased the size, the bulkiness and the cost of the receiver.

SUMMARY OF THE INVENTION

By the present invention, the above noted complications and disadvantages have been avoided and a simplified compact receiver lending itself to mass production is provided. This improved result is achieved by employing simplified DC connections which avoid the previous necessity for spacing and shielding. Combinations of resistance values are uniquely connected in a DC circuit for readily varying the voltages impressed on the tuning varactors of a radio receiver.

Accordingly, it is the object of the present invention to provide simplified multiple spreadband tuning circuitry for a varactor tuned radio receiver in which the construction of the receiver is simplified, the cost is reduced, and high volume production is facilitated.

Briefly stated, in accordance with one embodiment of this invention, there is provided, in a varactor tuned radio receiver utilizing circuitry for varying the voltage across varactors to tune the receiver, means for varying the voltage impressed upon the varactors to tune to any selected one of a plurality of spreadbands. The means for varying the voltage impressed upon the varactors includes first, second, and third variable resistance means and first and second contact means connected in a unique circuit arrangement. The resistance means and the contact means are supplied from a DC source. The first contact means, in the form of a pair of ganged switching devices, simultaneously adjusts the first and second variable resistance means to vary the ratio therebetween to impress a particular range of voltage across the varactors for tuning to a selected one of a plurality of spreadbands. The second contact means, in the form of an adjustable potentiometer, adjusts the third variable resistance means to impress a voltage within the particular range on the varactor to tune to a particular frequency within the selected spreadband.

BRIEF DESCRIPTION OF THE DRAWING

While the specification concludes with claims particularly pointing out and distinctly claiming the subject matter which is regarded as the invention, it is believed that the invention will be better understood from the following description taken in connection with the accompanying FIGURE of the drawing which is a schematic circuit diagram of one embodiment of the invention.

DETAILED DESCRIPTION OF A PREFERRED EMBODIMENT

Referring to the FIGURE of the drawing, in accordance with the present invention there is provided, within a varactor tuned radio receiver, unique resistor control circuitry 30 for tuning to any of a plurality of spreadbands. For the sake of clarity, only the elements directly associated with the varactor tuned circuitry are included within the FIGURE. These elements include an antenna stage 1, a radio frequency stage 2, an oscillator stage 3 and a mixer stage 4. The antenna stage includes an antenna, which is schematically represented by an inductor 5. The inductor is connected in series with capacitor 6 and voltage variable capacitor 7 (more commonly known as a varactor).

The radio frequency stage includes series connected varactor 8, inductor 9 and capacitor 10. The oscillator stage also includes a series connected varactor 11, inductor 12, and capacitor 13. Details of the coupling circuitry between each of these circuits have been omitted since they form no part of the present invention. The outputs of the radio frequency and the oscillator stages are fed into any well known mixer circuit, such as shown by the block 4, from which the intermediate frequency signal is obtained. The aforementioned stages 1, 2 and 3 are coupled through corresponding resistors 14, 15 and 16, respectively, to the resistor control circuitry 30 for tuning a selected one of a plurality of spreadbands. A D.C. power source 17 is connected, by any suitable means, into series with a first variable resistance means 18, which includes a plurality of resistors A to F, joined at one end to source 17. Resistors A to F are selectively connected by a switch 19 of switching means 20 to one side of a tuning potentiometer 21, which includes a resistor 22 and sliding contact 23. The other side of potentiometer 21 is selectively connected by switch 24 of switching means 20, which is ganged to switch 19, to a second variable resistance means 25. Resistance means 25 includes a plurality of resistors A' to F' joined at one end to ground.

A first ratio, that of the resistance values connected in the circuit of the first and second variable resistance means 18 and 25, determines, for a given source voltage, the approximate limits of the voltage range applied to the varactors and the spreadband in which tuning is to occur. A second ratio, that of the sum of the resistance values connected in the circuit of the first and second variable resistance means 18 and 25, to the resistance of the potentiometer 21, which is the third variable resistance means in the circuit, determines the width of said voltage range, and with the first ratio determines the extent of frequency coverage within a given spreadband. The potentiometer 21 finally adjusts the voltage applied across the varactors to tune to a desired frequency within the selected spreadband.

The resistances A to F of first resistance means 18 and the resistances A' to F' of second resistance means 25 are of oppositely progressing values when considering the succession in which switching occurs. For example, the resistances A to F may be of progressively increasing values and the resistances A' to F' may be of progressively decreasing values. Various combinations of resistance values may be selected. For example, the values may be chosen so that the sum of the resistances AA', BB' and CC', etc. are substantially equal if the bandwidth of each of the spreadbands to be tuned is the same and the voltage versus frequency characteristic of the varactors is substantially linear. Where the voltage vs. frequency characteristic of available varactors is not linear, which is normally the case, the sum of the resistances of AA', etc., may be selected to be unequal so as to compensate for such non-linearity and provide spreadbands of equal widths, or may be selected in various fashions to provide spreadbands of different widths. Typically, one to two volts are applied across the potentiometer 21 for tuning within a given spreadband, the overall voltage range for all spreadbands being in the order of 10 volts.

In operation, to tune a particular frequency within a selected one of a plurality of spreadbands, the switching means 20 is adjusted to simultaneously move switches 19 and 24 to connect to selected corresponding resistors within the first and second variable resistance means 18 and 25 to select the desired spreadband. When the switching means is in a first position, wherein the switches 19 and 24 connect resistors A and A' respectively in the circuit, the ratio of the resistance of A to A' causes the receiver to be tuned to a first spreadband. If A to F are of progressively increasing value and A' to F' of progressively decreasing value, this will apply a voltage range of maximum voltage to the varactors. With the switches moved to connect resistors B and B' in the circuit, thereby increasing the resistance of the first resistance means 18 and decreasing the resistance of the second resistance means 25, a different ratio is established, and the receiver is tuned to a second spreadband. In the referred to exemplary configuration, the next to highest voltage range is applied to said varactors. By moving the ganged switches to connect different pairs of resistors in the circuit, any of the six available spreadbands may be selected. After the desired spreadband has been selected by the switch means 20, the receiver is tuned to the particular station within the selected spreadband by moving the sliding contact 23 until the desired station is tuned.

What is claimed as new and desired to be secured by Letters Patent of the United States is:

1. In a radio receiver employing varactor tuning circuitry, means for adjusting the voltage impressed upon the varactors so as to tune to a desired frequency within a selected one of a plurality of spreadbands, comprising:

a. first variable resistance means including a first plurality of resistors, b. second variable resistance means including a second plurality of resistors, c. third variable resistance means, said first, second and third variable resistance means being connected in a series circuit with said third variable resistance means intermediate said first and second variable resistance means, d. means for connecting said series circuit to a D.C. power supply, e. first contact means for simultaneously adjusting the resistance of said first and second variable resistance means to vary the ratio therebetween for impressing a given range of voltage across said third variable resistance means, said first contact means including first and second ganged switches for coupling different pairs of corresponding resistors of said first and second pluralities of resistors into said series circuit, and f. second contact means for adjusting said third variable resistance means to impress a particular voltage within said given range of voltage for application to the varactors so as to tune to a particular frequency corresponding to said particular voltage, within a selected spreadband corresponding to said given range of voltage.

2. The combination recited in claim 1 wherein said first and second plurality of resistors have oppositely progressing values in the direction of switching.

3. The combination recited in claim 2 wherein said third variable resistor in a potentiometer and said second contact means includes a sliding contact for varying the voltage impressed on the varactors to tune the receiver to a particular frequency within the selected spreadband.

4. The combination recited in claim 3 wherein the voltage versus frequency characteristic of said varactors is nonlinear, the sum of the resistances of said pairs of corresponding resistors being of unequal value so as to compensate for said nonlinearity and provide spreadbands of approximately equal bandwidths.

* * * * *